United States Patent
De Brouwer et al.

(10) Patent No.: US 10,710,652 B2
(45) Date of Patent: Jul. 14, 2020

(54) ROUNDED TRACK IDLERS

(71) Applicant: CNH Industrial America LLC, New Holland, PA (US)

(72) Inventors: Bart De Brouwer, Bruges (BE); Patrick Piens, Destelbergen (BE); Jean-Pierre Vandendriessche, Erpe-Mere (BE); Carlos J. A. Verheye, Roeselare (BE)

(73) Assignee: CNH Industrial America LLC, New Holland, PA (US)

( * ) Notice: Subject to any disclaimer, the term of this patent is extended or adjusted under 35 U.S.C. 154(b) by 125 days.

(21) Appl. No.: 15/577,877

(22) PCT Filed: May 29, 2016

(86) PCT No.: PCT/EP2016/062097
§ 371 (c)(1),
(2) Date: Nov. 29, 2017

(87) PCT Pub. No.: WO2016/193184
PCT Pub. Date: Dec. 8, 2016

(65) Prior Publication Data
US 2018/0170464 A1   Jun. 21, 2018

(30) Foreign Application Priority Data
May 29, 2015   (BE) .................................. 2015/0152

(51) Int. Cl.
*B62D 55/14*   (2006.01)
*B62D 55/10*   (2006.01)
(Continued)

(52) U.S. Cl.
CPC ............. *B62D 55/14* (2013.01); *B62D 55/10* (2013.01); *B62D 55/125* (2013.01); *B62D 55/15* (2013.01);
(Continued)

(58) Field of Classification Search
CPC ...... B62D 55/14; B62D 55/125; B62D 55/15; B62D 55/10; B62D 55/244; B62D 55/305; B62D 55/112
(Continued)

(56) References Cited

U.S. PATENT DOCUMENTS 5,829,848 A * 11/1998 Kelderman ............ B62D 55/04
305/15
5,938,006 A * 8/1999 Fisher .................... B65G 15/02
198/831

(Continued)

FOREIGN PATENT DOCUMENTS

WO   2011041704 A1   4/2011
WO   2015138415 A1   9/2015

*Primary Examiner* — S. Joseph Morano
*Assistant Examiner* — Jean W Charleston
(74) *Attorney, Agent, or Firm* — Peter Zacharias; Patrick Sheldrake

(57) ABSTRACT

An agricultural vehicle has a chassis with a drivetrain and at least one rubber track assembly with a rubber track belt. The rubber track assembly has at least one idler, each of which has two idler wheels spaced apart on an axle. The idler wheels each have a tapered outer surface that together define a tapered profile that causes the rubber track belt to self-center upon the rubber track assembly. The tapered profile may define a pair of straight lines at a shallow angle, a portion of a circle, a portion of an ellipse, a parabola, or a hyperbola.

12 Claims, 14 Drawing Sheets

(51) Int. Cl.
*B62D 55/24* (2006.01)
*B62D 55/125* (2006.01)
*B62D 55/15* (2006.01)
B62D 55/112 (2006.01)
B62D 55/30 (2006.01)

(52) U.S. Cl.
CPC .......... *B62D 55/244* (2013.01); *B62D 55/112* (2013.01); *B62D 55/305* (2013.01)

(58) Field of Classification Search
USPC ........................................................ 305/136
See application file for complete search history.

(56) References Cited

U.S. PATENT DOCUMENTS

| | | | |
|---|---|---|---|
| 6,536,854 B2* | 3/2003 | Juncker | B62D 55/04 305/115 |
| 6,712,549 B2 | 3/2004 | Roth | |
| 8,245,800 B2 | 8/2012 | Hansen | |
| 2001/0030068 A1* | 10/2001 | Nagorkca | B62D 55/08 180/6.2 |
| 2005/0035655 A1 | 2/2005 | Beckstrom et al. | |
| 2012/0001478 A1 | 1/2012 | Zuchoski et al. | |
| 2012/0212045 A1* | 8/2012 | Prohaska | B62D 11/22 305/141 |
| 2015/0259016 A1* | 9/2015 | Reshad | B62D 55/084 280/28.5 |

* cited by examiner

ROUNDED TRACK IDLERS

BACKGROUND OF THE INVENTION

The present invention relates to track systems for tracked vehicles, and, more particularly, to the idlers of such tracked systems.

Farmers utilize a wide variety of vehicles and implements, among them are vehicles having tracked drive systems. A tracked drive is a system of vehicle propulsion in which a continuous band of treads is driven by two or more wheels. This band is typically made of modular steel plates, in the case of military vehicles and construction equipment, or rubber reinforced with steel wires in the case of agricultural or lighter construction vehicles. The large surface area of the track distributes the weight of the vehicle better than wheels on an equivalent vehicle, enabling a continuous tracked vehicle to traverse soft ground with superior traction and less likelihood of becoming stuck.

Often, a reinforced rubber track belt with chevron treads is used. In comparison to steel tracks, rubber track belts are lighter, make less noise, create less maximal ground pressure and do not damage paved roads. Generally rubber track belts are formed around a basic carcass or belt. The carcass includes an endless belt-shaped rubber-like elastic member, a number of core bars, which can be made of metal, can be embedded therein and aligned and extend in traverse direction of the track. Steel cords, which serve as tension-resistant members may be embedded in the endless elastic member to surround the core bars.

Alignment of rubber track belts is difficult on all tracked vehicles. This is especially the case on combine harvesters where heavy loads are put on the tracks. Different alignment solutions exist, to align the rubber belts on all vehicles and different track undercarriages. If the alignment of the rubber belts is not done properly, this leads to severely reduced lifetime of the rubber belts and potential early replacement which is an expensive cost. Additional consequential damages may occur from an improperly aligned rubber belt such as failing rollers or idlers. For all existing track undercarriages, the process of aligning the track belts is a very sensitive and lengthy process which requires some experience of the operator with tracked systems.

What is needed in the art is a way to minimize the sensitivity of rubber track systems to misalignment and to improve the self-aligning characteristics of such rubber track systems subject to forces that cause misalignment.

SUMMARY OF THE INVENTION

The present invention provides a rubber track system that has improved self-aligning characteristics, and therefore minimizes sensitivity to misalignment and subsequent consequential damages from such misalignment.

The invention in one form is directed to a rubber track assembly for a vehicle, having a track assembly undercarriage, at least one idler, and a rubber track belt. Each of the at least one idlers has two idler wheels spaced apart on an axle. The idler wheels each have a tapered outer surface with an inner diameter D that is always greater than the outer diameter d. The tapered outer surfaces of the two idler wheels together define a tapered profile that causes the rubber track belt to self-center upon the rubber track assembly.

An advantage of the present invention is that it causes the rubber track belt of a rubber track assembly to be largely self-centering and therefore less sensitive to initial misalignment upon installation or subsequent misalignment caused by lateral forces experienced during operation.

Another advantage is that the present invention minimizes adverse wear to the rubber track belt and to the idlers, bogies, and drive sprocket of the rubber track assembly, thereby minimizing expensive repair and replacement of these components.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
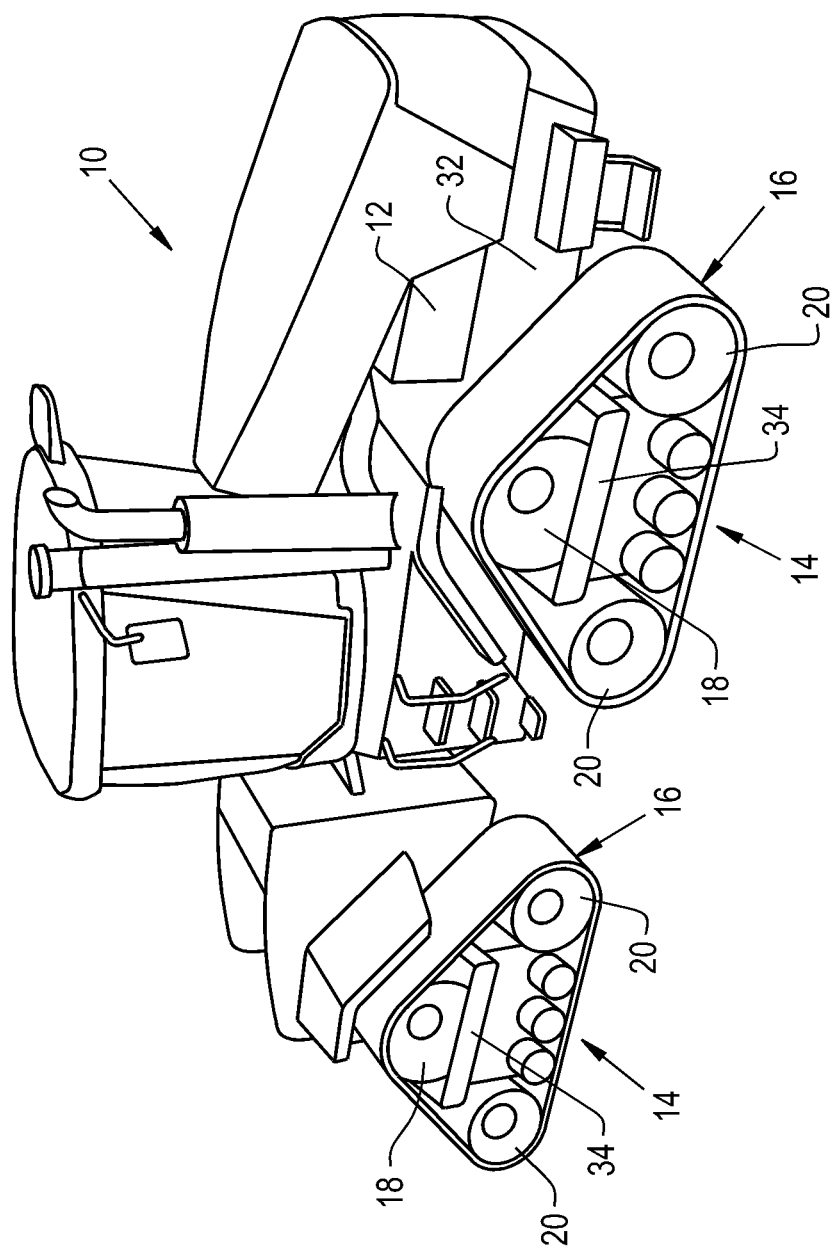
FIG. 1 is an isometric view of an agricultural vehicle having rubber track assemblies.

Referring now to the drawings, and more particularly to FIG. 1, there is shown an embodiment of rubberized track assemblies 14 in use by an agricultural vehicle 10. Agricultural vehicle 10 has a chassis 32 with a drive train 12 that includes a drive sprocket 18, which drives the rubber track belt 16 of the rubber track assembly 14. Idlers 20 function to both define the geometry of the rubber track assembly 14, and to provide tension in the rubber track belt 16. Drive sprocket 18 and idlers 20 are attached to track assembly undercarriage 34.

Figure 2:
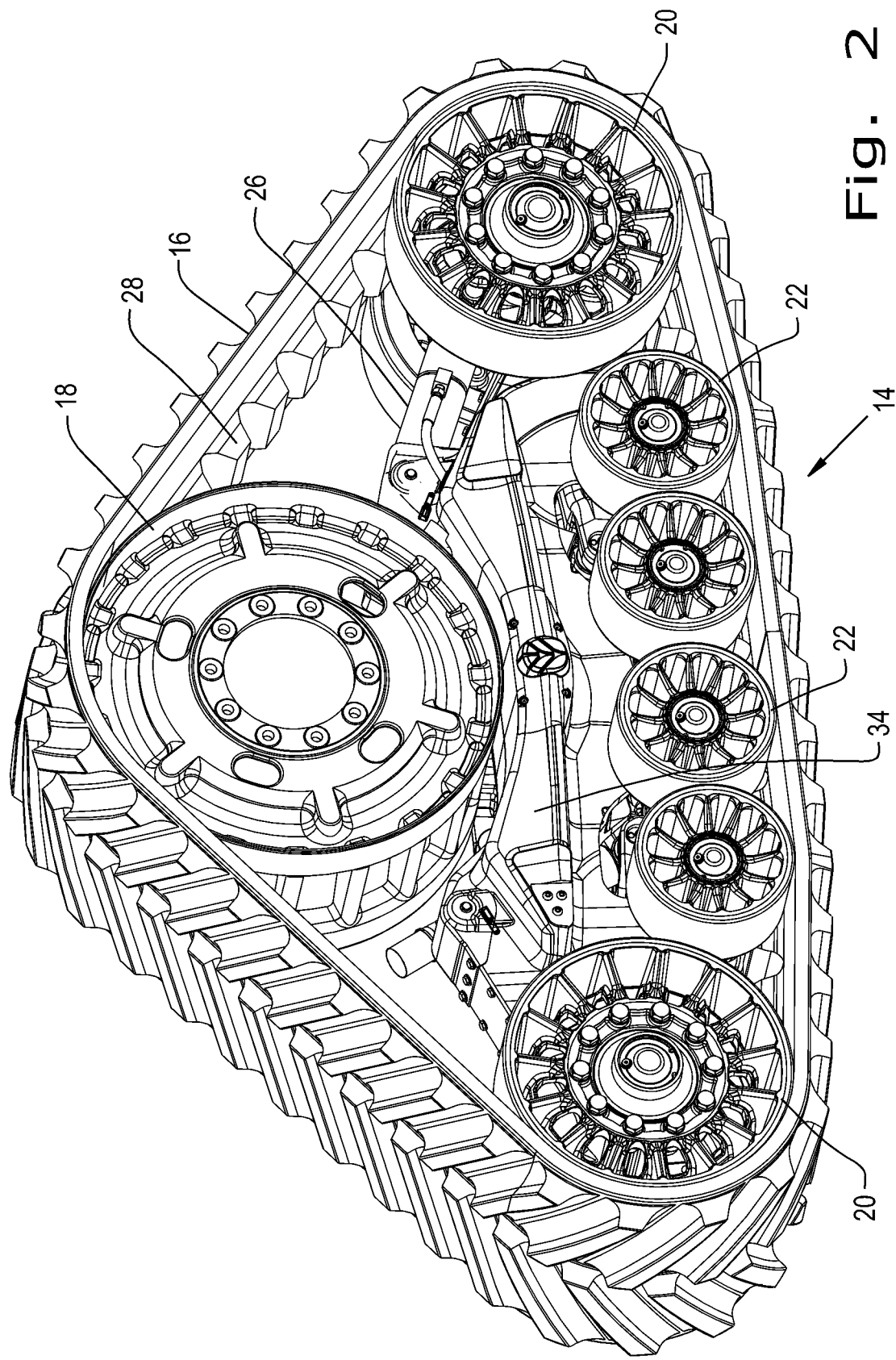
FIG. 2 is an isometric view of a rubber track assembly.
Figure 3:
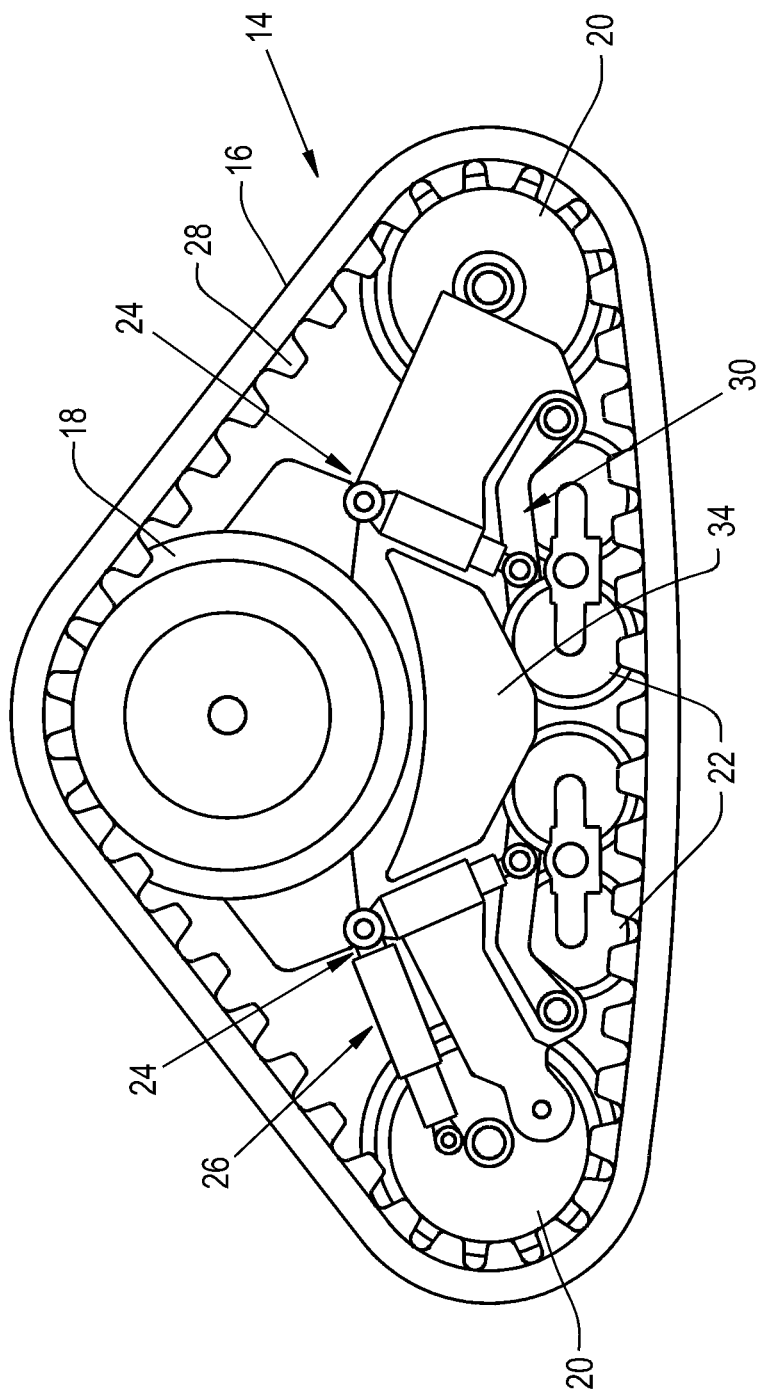
FIG. 3 is a front view of a rubber track assembly.

Now, additionally referring to FIGS. 2 and 3 there is shown a rubber track assembly 14 having a rubber track belt 16 engaged with a drive sprocket 18 and two idlers 20 carried by track assembly undercarriage 34. The rubber track belt 16 is driven by the drive sprocket 18, and is kept in tension by the two idlers 20, which are pressed outward using hydraulic tensioner cylinders 26. Two sets of 2×2 bogies 22 provide vertical support to the rubber track assembly 14 as they roll along the inner surface of the rubber track belt 16. This vertical support provided by the two sets of 2×2 bogies 22 is transmitted to the rubber track assembly 14 through hydraulic suspension cylinders 24 attached to suspension arms 30, to which the 2×2 bogies 22 are connected. Two sets of 2×2 bogies 22 are shown, but more or less such bogies 22 may be utilized. Furthermore, 2×2 bogies 22 may not be used at all. Instead, separate individually suspended rollers may be provided, or multiple rollers may be provided on a single roller beam. Also, hydraulic suspension cylinders 24 may not be used. Alternative types of suspensions that may be used instead include but are not limited to rubber suspensions, steel spring suspensions, and air spring suspensions.

The rubber track belt 16 is provided with central lugs 28, which engage the drive sprocket 18 like gear teeth, and prevent slippage between the drive sprocket 18 and the rubber track belt 16. The central lugs 28 also provide some resistance of the rubber track belt 16 from becoming misaligned from its intended position centered over the drive sprocket 18 and idlers 20, or from moving laterally and entirely disengaging from the rubber track assembly 14.

Figure 4:
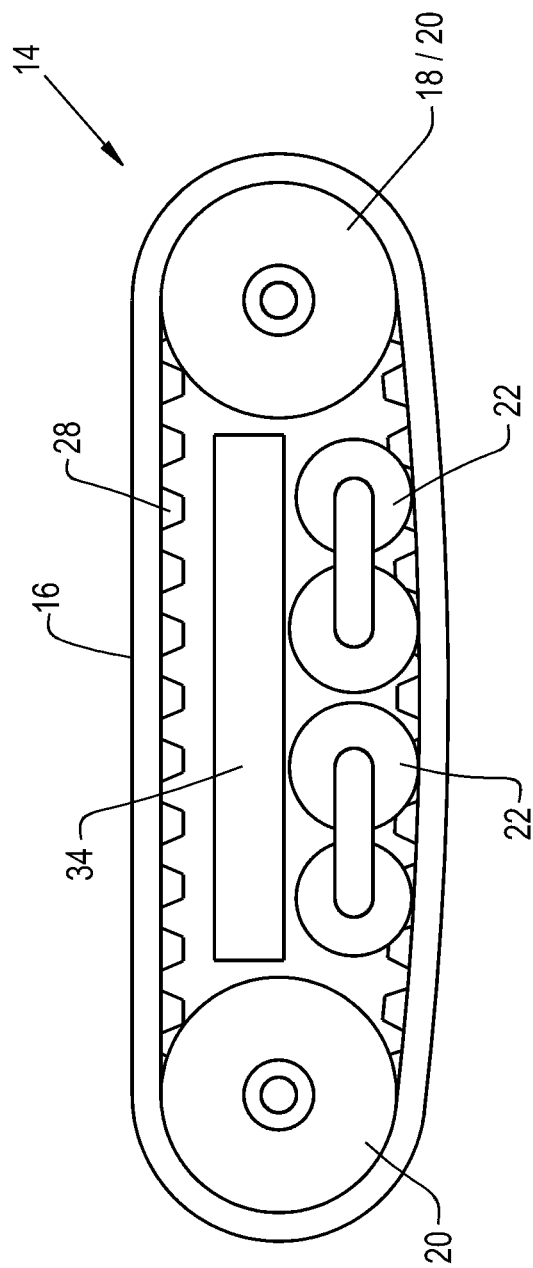
FIG. 4 is a front view of an alternate embodiment of a rubber track assembly.

FIG. 4 shows an alternate embodiment of a rubber track assembly 14 having track assembly undercarriage 34. In this embodiment, a separate drive sprocket 18 is not provided. Instead, one idler 20 is a combination idler and drive sprocket 18/20, which may drive the rubber track belt 16 by gear-like engagement with central lugs 28, or may drive the rubber track belt 16 simply through friction contact. The alternate embodiment of rubber track assembly 14 is again shown with 2×2 bogies 22, but as before, may be instead provided with separate individually suspended rollers or multiple rollers on a single roller beam.

Figure 5:
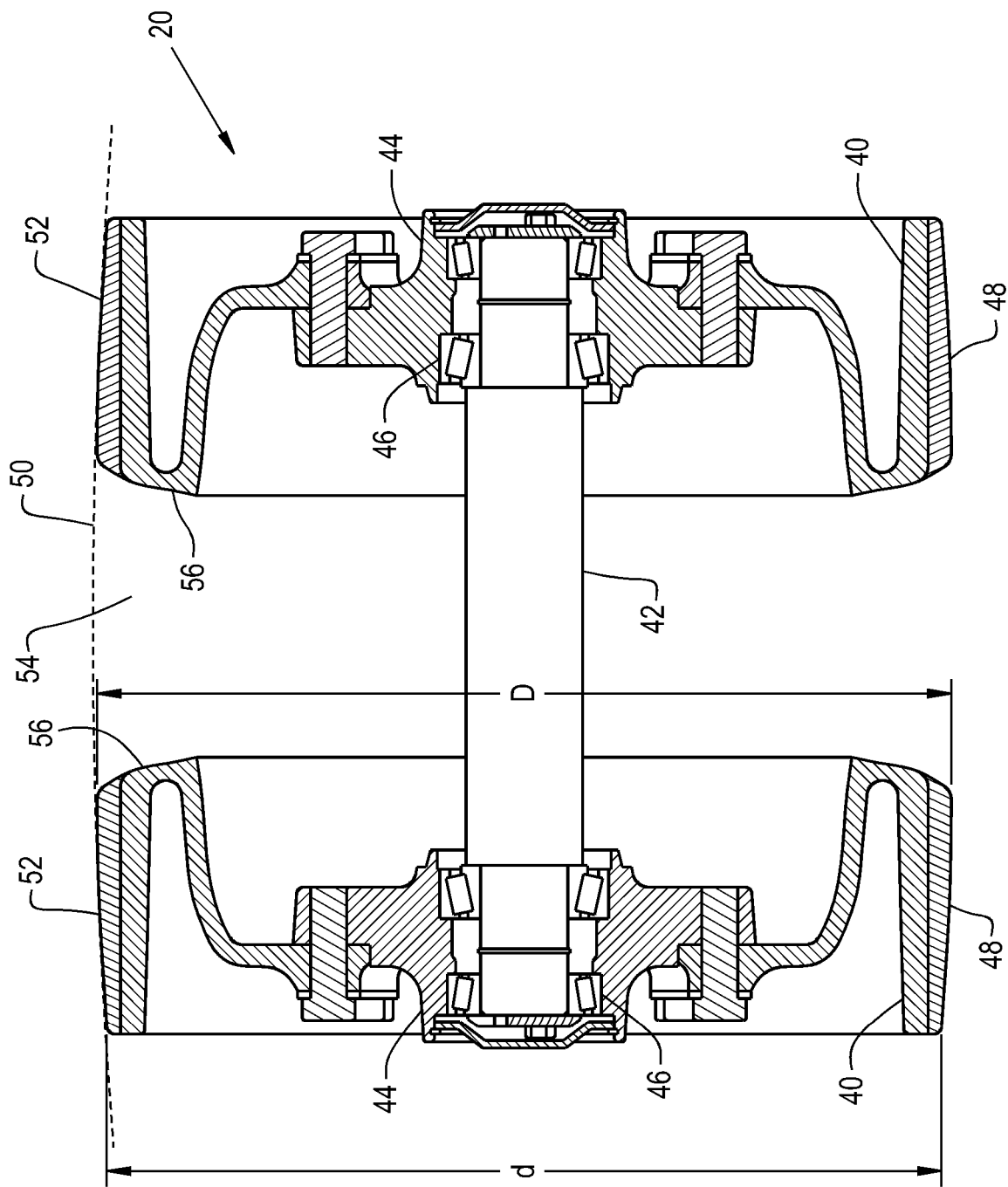
FIG. 5 is a sectional view of a pair of idler wheels from the rubber track assembly.

While the central lugs 28 do provide some such resistance of the rubber track belt 16 to misalignment or complete disengagement from the rubber track assembly 14, the rubber track belt 16 is sensitive to misalignment and subject to adverse wear should certain components of the rubber track assembly become misaligned. In order to minimize this sensitivity to misalignment and adverse wear resulting therefrom, the present invention provides idler wheels 40 with tapered outer surfaces 52, as shown in FIG. 5. FIG. 5 shows a sectional view of an idler 20 made up of two idler wheels 40 and an idler axle 42. The idler wheels 40 rotate on idler hubs 44, which ride on idler bearings 46 on the idler axle 42. The space between the idler wheels 40 functions as an idler wheel set lug gap 54 for passage therethrough and guidance of the central lugs 28 of the rubber track belt 16 (not shown in FIG. 5). In order to assist with the entry of the central lugs 28 into the idler wheel set lug gap 54, an idler wheel lug centering incline 56 is provided. Note that the embodiment of the idler 20 shown in FIG. 5 shows the idler hubs 44 riding on idler bearings 46 on the idler axle 42. An alternate embodiment may have the idler hubs 44 directly attached to the idler axle 42, with the idler axle 42 riding in bearings in the rubber track assembly 14, in other words so that the idler wheels 40 turn in fixed relation to one another.

Figure 9A:
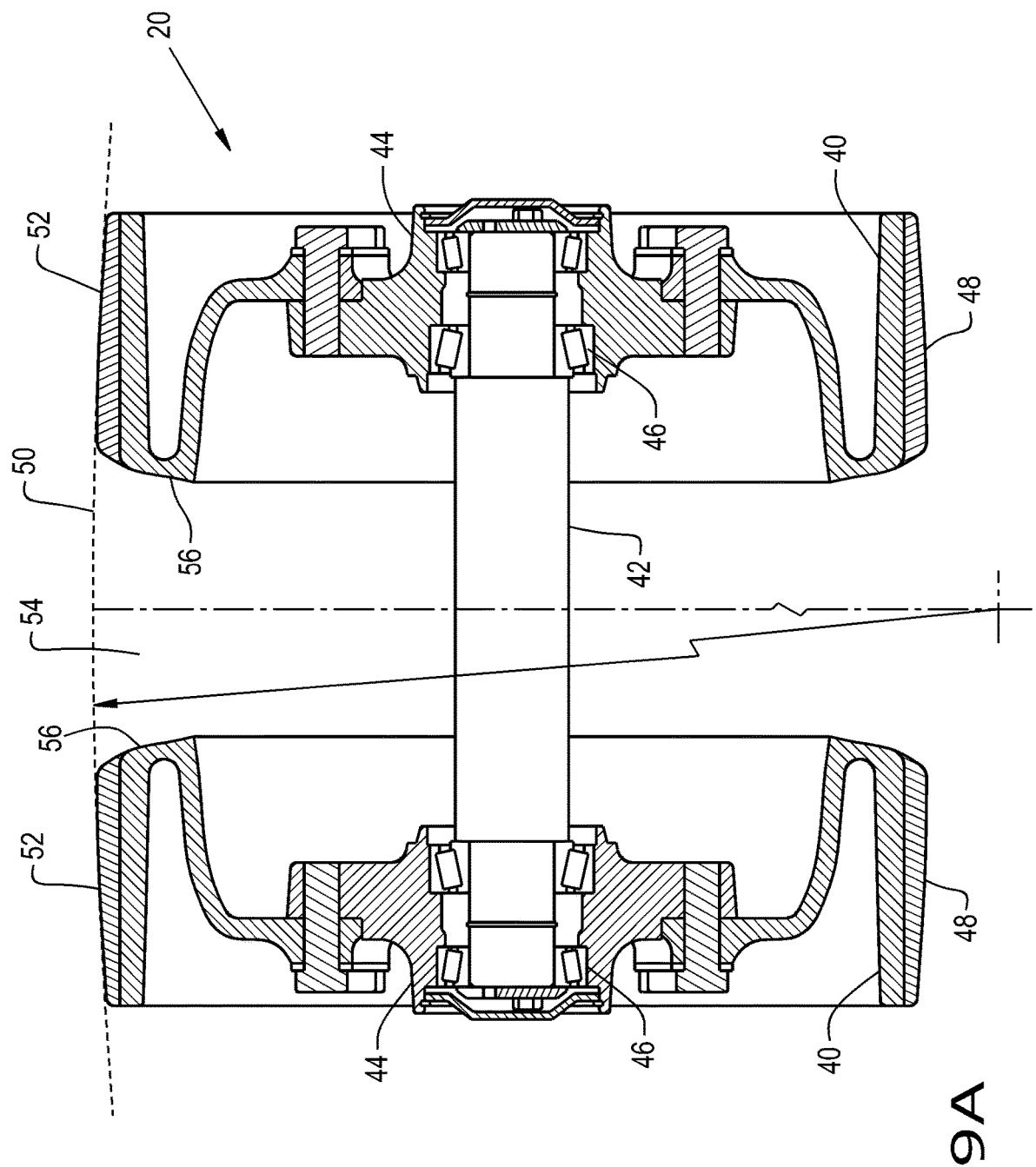
FIG. 9A is a sectional view of an idler wheel.
Figure 9B:
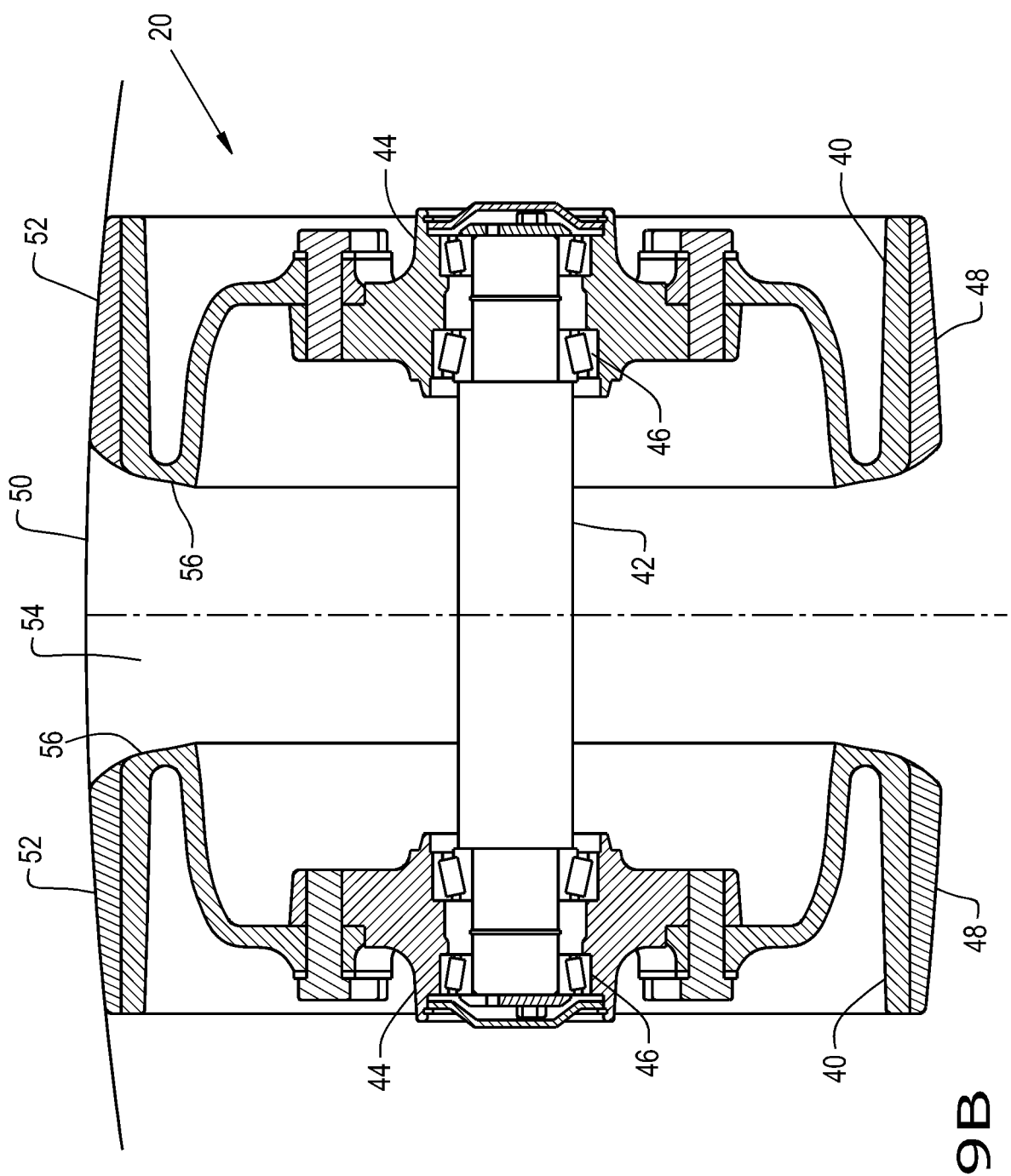
FIG. 9B is a sectional view of an idler wheel.
Figure 9C:
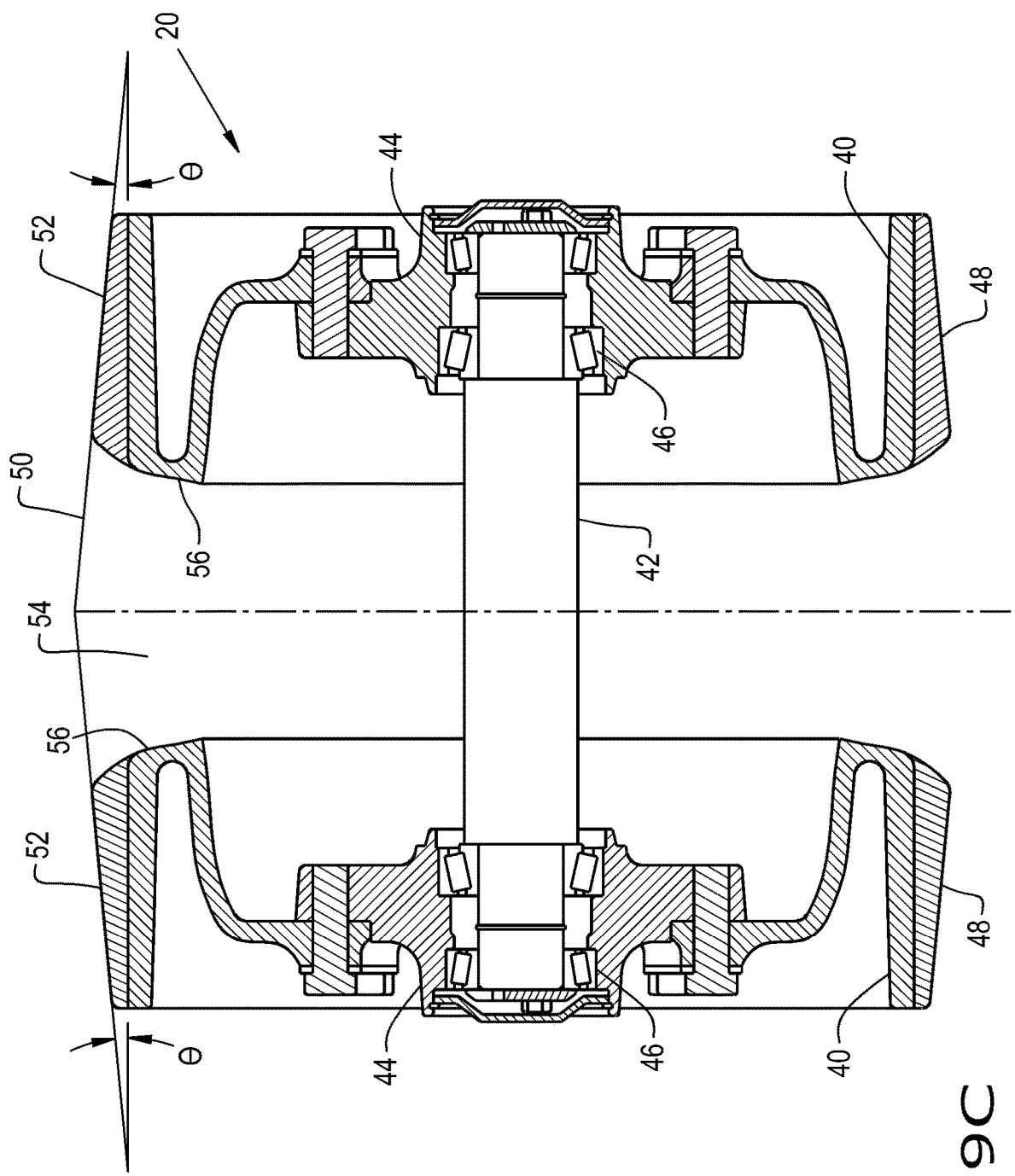
FIG. 9C is a sectional view of an idler wheel.
Figure 10A:
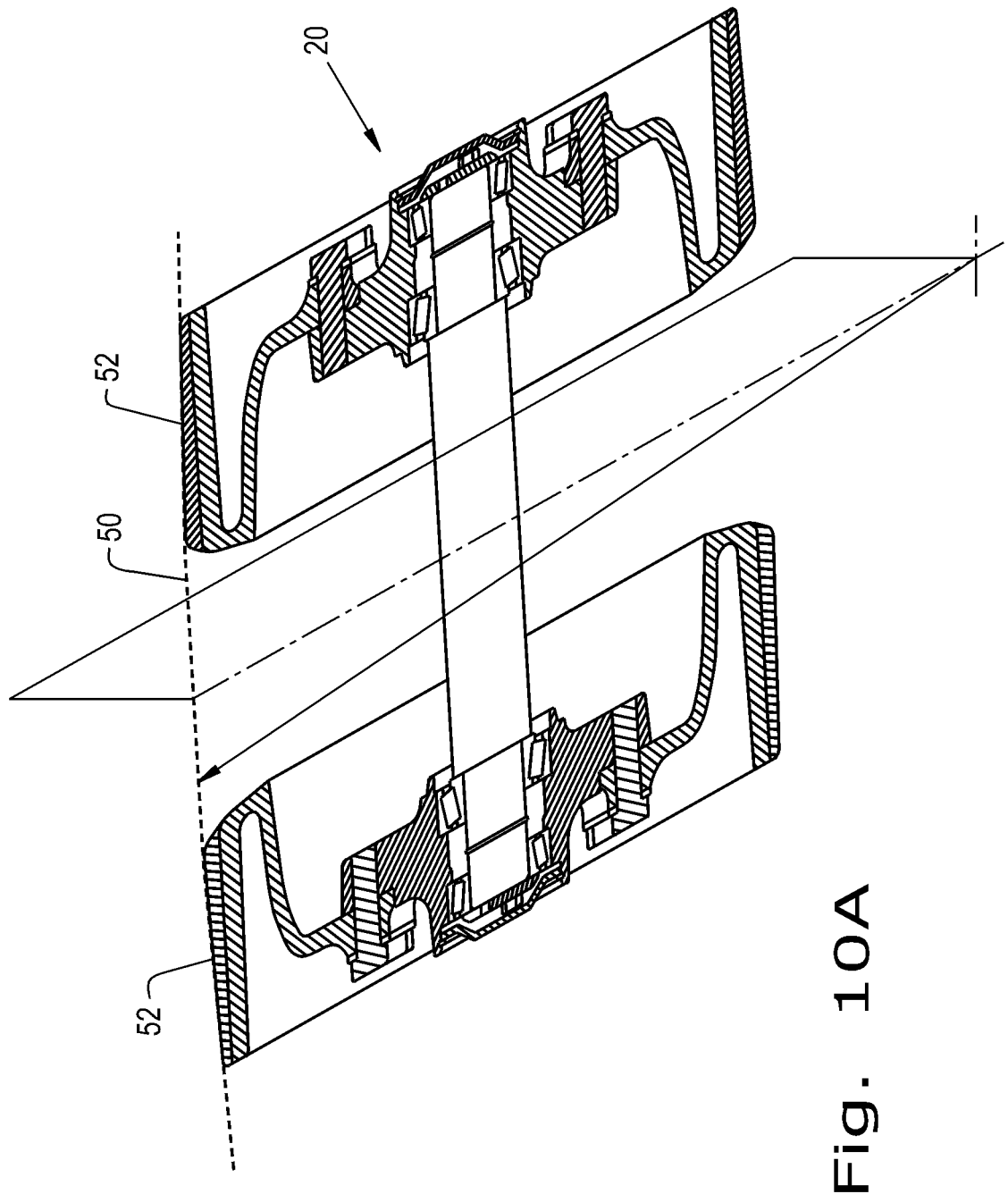
FIG. 10A is a sectional view of an idler wheel.
Figure 10B:
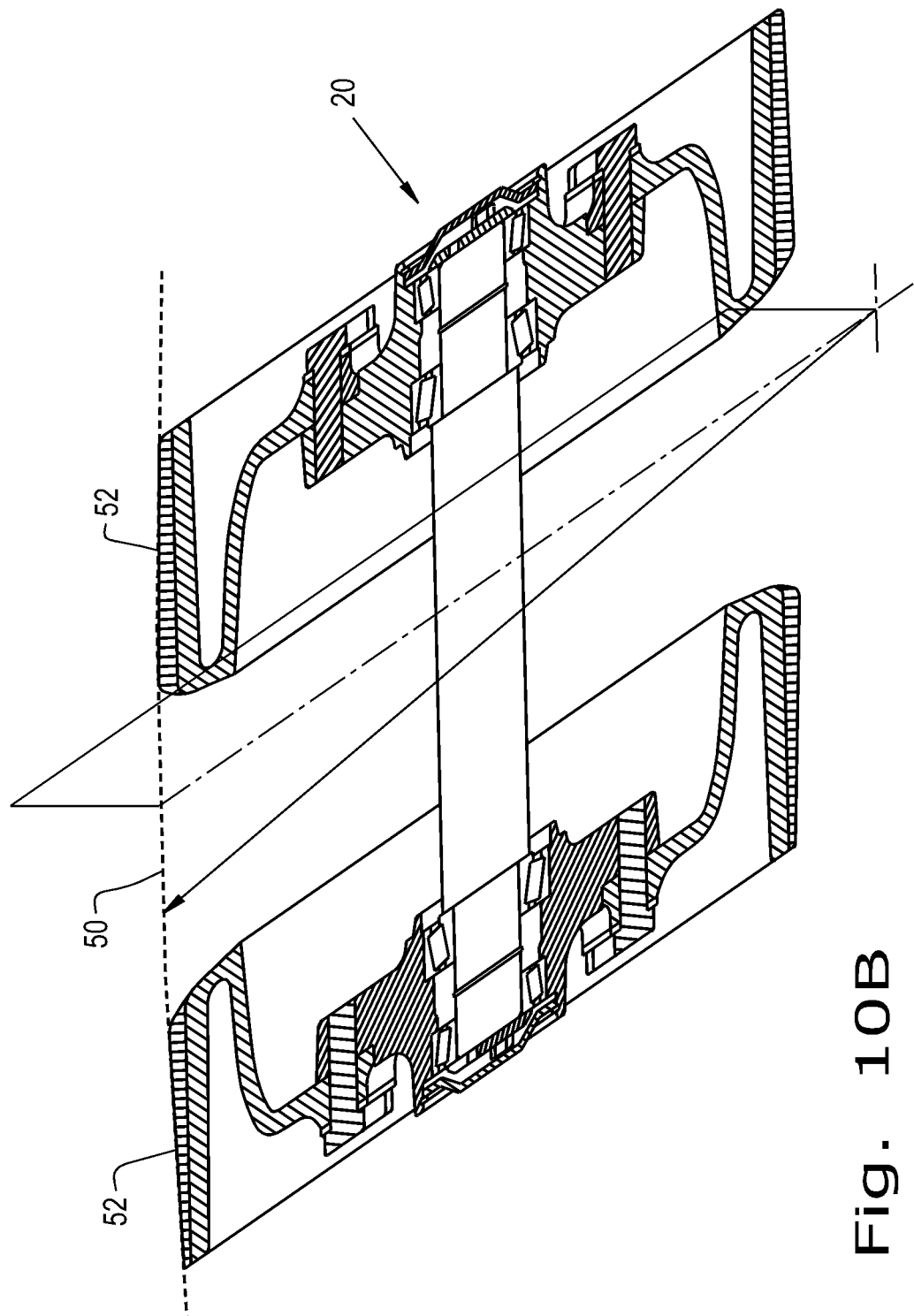
FIG. 10B is a sectional view of an idler wheel.
Figure 10C:
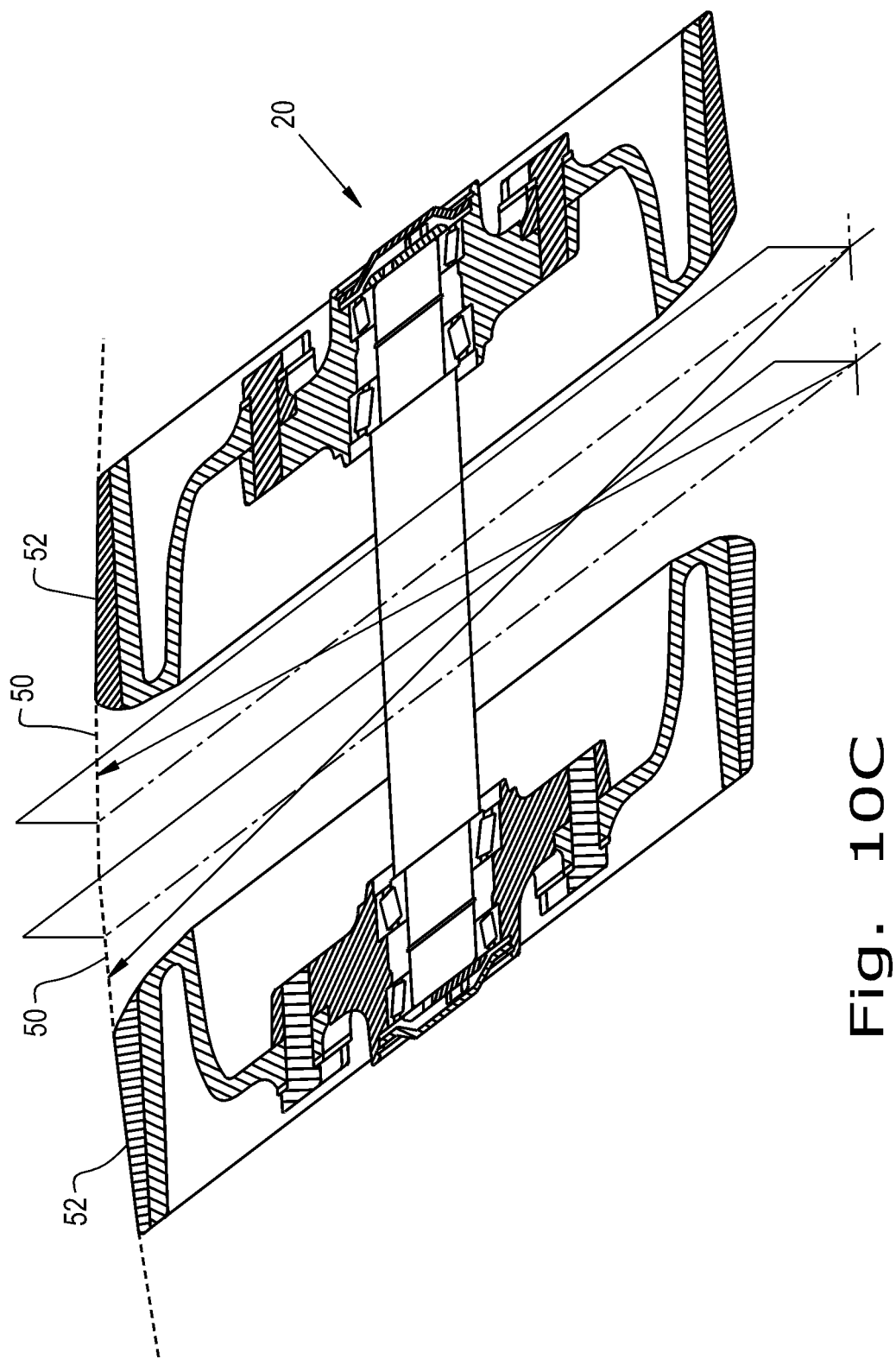
FIG. 10C is a sectional view of an idler wheel.
Figure 10D:
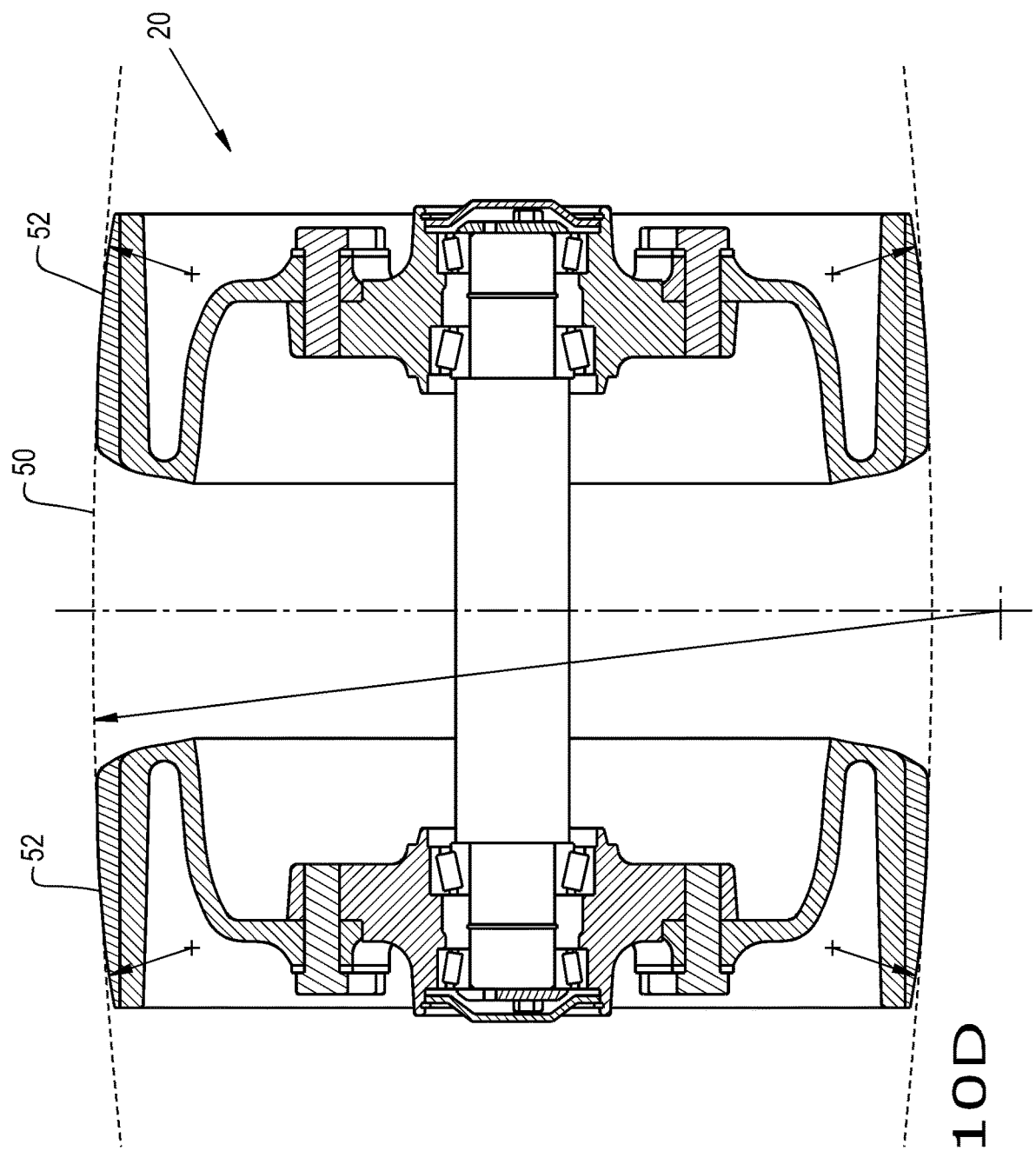
FIG. 10D is a sectional view of an idler wheel.

The present invention provides an idler tapered profile 50 defined by the idler tapered outer surface 52 of idler tires 48. This idler tapered profile 50 may define a shallow arc, of which each idler tapered outer surface 52 defines a portion. This shallow arc may have its center point located on a line that passes through the midpoint of the idler axle 40 in a plane perpendicular to the axis of the idler axle 40, thus being symmetric about the two idler wheels 40, as shown in FIG. 10A. Alternately, the shallow arc may have its center point located on a plane that is not coplanar with the midpoint of the idler axle 40 or centered between the two idler wheels 40, as shown in FIG. 10B, in order to take into account an offset of the idler 20 from the center of the rubber track assembly 14. In this case one idler wheel 40 may be thinner than the other, or one idler tire 48 may be formed with a different profile than the other. The described asymmetry may further be incorporated to take into account some bias or asymmetry incorporated into the rubber track belt 16. The shallow arc of the idler tapered profile 50 may be a portion of a circle, as shown in FIG. 9A. Alternately, the shallow arc of the idler tapered profile 50 may be a portion of an ellipse, a parabola, or a hyperbola, as shown in FIG. 9B. In another alternative, the idler tapered profile 50 may be a pair of straight lines at a shallow angle θ, as shown in FIG. 9C, so that the idler tapered outer surface 52 of each idler wheel 40 represents a shallow flat-sided cone segment. In a further alternative, the shallow arc of the idler tapered profile 50 may be discontinuous, so that two shallow arcs are described, one for each idler wheel 40, as shown in FIG. 10C. In this case, the center point of each shallow arc may be in a plane closer to the idler wheel 40 that defines that shallow arc, or may be in a plane closer to the other idler wheel. In a further alternative, the shallow arc of the idler tapered profile 50 may be discontinuous, so that two or more arc portions with differing radii are defined by each idler wheel 40, as shown in FIG. 10D.

As the shallow arc or arcs of the idler tapered profile 50 of which each idler tapered outer surface 52 defines a portion has a center point or center points in the direction towards the midpoint of the idler axle 40 from each idler wheel 40, the shallow arc or arcs of the idler tapered profile 50 therefore define the idler tapered outer surface 52 in such a way that the inner diameter "D" is always greater than the outer diameter "d" of each idler wheel 40 of each idler 20. This results in a self-centering effect of the rubber track belt 16 as it rides on the idlers 20. In this way, the sensitivity of the rubber track belt 16 to initial misalignment upon installation on the rubber track assembly 14, or to subsequent misalignment due to lateral forces experienced during operation, is minimized. Contact and resultant wear is also minimized between the central lugs 28 of the rubber track belt 16 and the inner surfaces of the idler wheels 40, or between the central lugs 28 and the analogous inner surfaces of the drive sprocket 18 or 2×2 bogies 22. Additionally, the rubber track belt 16 of the rubber track assembly 14 may have an inner surface that has a curved profile to match the shallow arc or arcs of the idler tapered profile 50. Furthermore, each of the drive sprocket 18 and the wheels of the 2×2 bogies 22 may also have at least partial curved outer surfaces that define tapered profiles similar to the described idler tapered profile 50.

Figure 6:
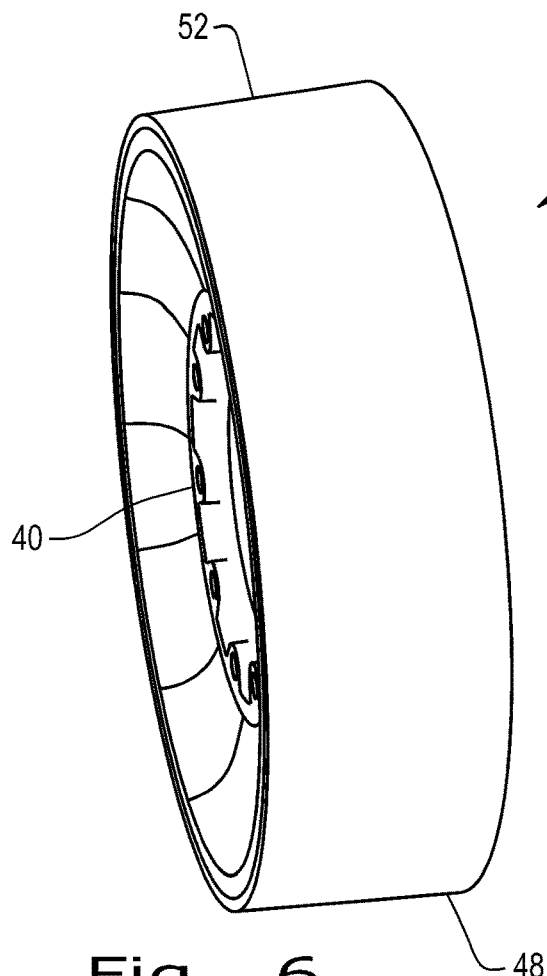
FIG. 6 is an isometric view of an idler wheel.
Figure 7:
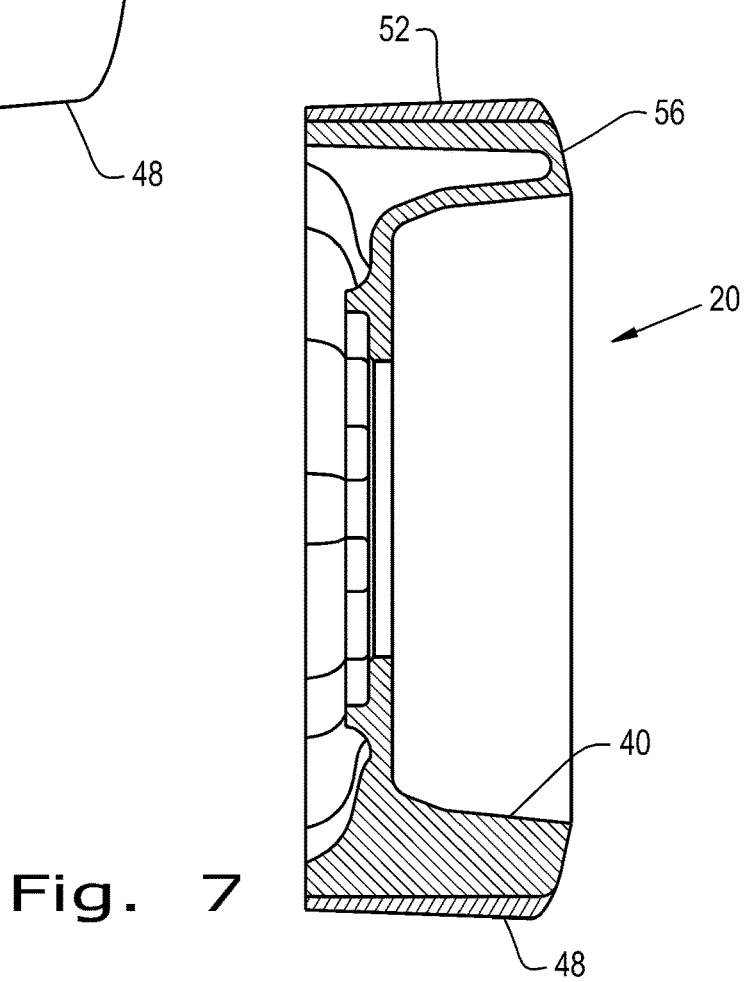
FIG. 7 is a sectional view of an idler wheel.
Figure 8:
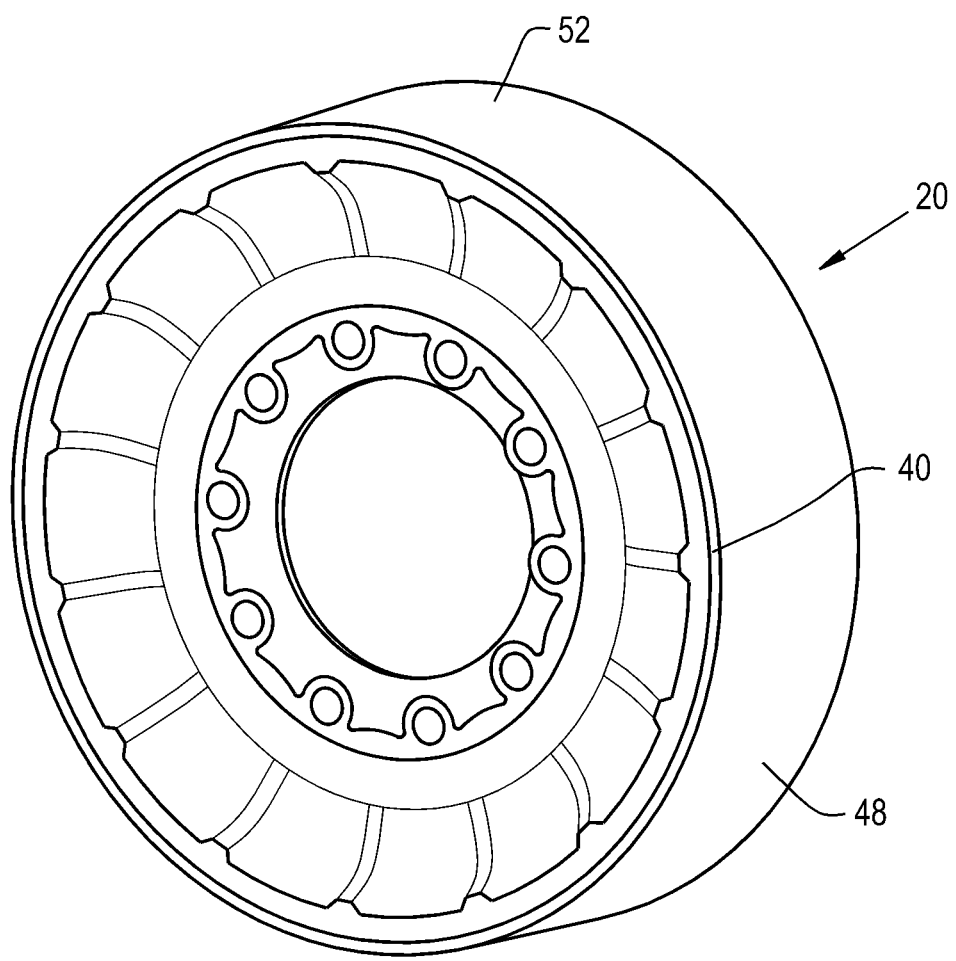
FIG. 8 is an isometric view of an idler wheel.

Now, additionally referring to FIGS. 6 through 8, an embodiment of an idler wheel 40 of the idler 20 is shown in various views. FIG. 6 is a shallow angle isometric view, FIG. 7 is a sectional view, and FIG. 8 is a steep angle isometric view. Each idler wheel 40 is again provided with an idler tire 48 having an idler tapered outer surface 52, and an idler wheel centering incline 56.

The invention claimed is:

1. A rubber track assembly for a vehicle, comprising:
   an axle;
   a track assembly undercarriage;
   at least one idler comprising two idler wheels spaced apart on the axle, the two idler wheels being rotatable about an axis defined by the axle, the two idler wheels each having a first axial side and a second axial side, the first and second axial sides being spaced apart along the axis, each of the two idler wheels further having a tapered outer surface extending between the first and second axial sides, the tapered outer surface having an inner diameter at the first axial side and an outer diameter at the second axial side, the inner diameter being greater than the outer diameter; and a rubber track belt;
wherein the tapered outer surfaces of the two idler wheels together define a tapered profile for causing the rubber track belt to self-center,
wherein the tapered profile defined by the tapered outer surfaces comprises a non-linear portion, and
wherein the first axial sides of the two idler wheels each have a lug centering portion tapering radially inwardly from the tapered outer surface.

2. The rubber track assembly of claim 1, wherein:
the non-linear portion comprises a portion of one of a circle, an ellipse, a parabola, or a hyperbola.

3. The rubber track assembly of claim 1, wherein:
the tapered profile is symmetric about a point on a line that intersects a midpoint of an axis of the at least one idler in a plane that is midway between the two idler wheels and perpendicular to the axis of the at least one idler, and thus the tapered outer surfaces of the two idler wheels are identical in profile.

4. The rubber track assembly of claim 1, wherein:
the tapered profile is symmetric about a point on a line that intersects an axis of the at least one idler in a plane that is not midway between the two idler wheels but is perpendicular to the axis of the at least one idler, and thus the tapered outer surfaces of the two idler wheels are dissimilar in profile.

5. The rubber track assembly of claim 1, wherein:
the tapered profile is discontinuous such that each tapered outer surface of each of the two idler wheels defines a separate tapered profile, each separate tapered profile comprising a non-linear portion, the non-linear portion including a portion of one of a circle, an ellipse, a parabola, or a hyperbola, each separate tapered profile being symmetric about a point on a separate line that intersects the axis of the at least one idler in a separate plane that is not midway between the two idler wheels but is perpendicular to the axis of the at least one idler.

6. The rubber track assembly of claim 1, wherein:
the tapered profile is discontinuous such that the tapered outer surface of at least one of the two idler wheels has at least two arc portions of differing radii.

7. The rubber track assembly of claim 1, further comprising:
an idler tire attached to each idler wheel, each idler tire defining the tapered outer surface of the respective idler wheel such that the idler tires together define the tapered profile.

8. The rubber track assembly of claim 1, wherein:
the rubber track belt has an inner surface that has a tapered profile to match the tapered profile defined by the tapered outer surfaces of the two idler wheels.

9. The rubber track assembly of claim 1, wherein:
the two idler wheels have hubs which ride on bearings upon the axle.

10. The rubber track assembly of claim 1, wherein:
the two idler wheels are attached to the axle and the axle rides on bearings such that the two idler wheels turn in fixed relation to one another.

11. The rubber track assembly of claim 1, further comprising:
a drive sprocket and at least one bogie wheel, at least one of the drive sprocket and the at least one bogie wheel having a tapered outer surface defining a tapered profile similar to the tapered outer surfaces defining the tapered profiles of the idler wheels of the at least one idler.

12. The rubber track assembly of claim 1, wherein:
the at least one idler is configured as a combination-idler-and-drive-sprocket such that one of the two idler wheels of the at least one idler functions as a drive sprocket.

* * * * *